Patented Oct. 29, 1935

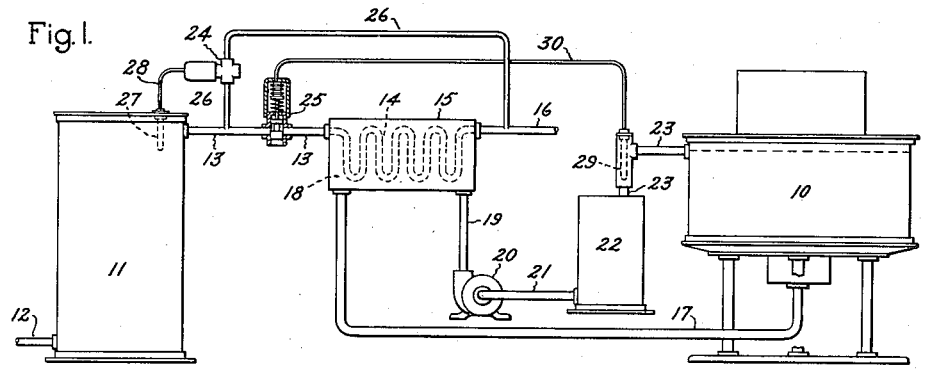

2,019,334

UNITED STATES PATENT OFFICE 2,019,334

COMBINED RECTIFIER AND TRANSFORMER COOLING SYSTEM

Theophilus F. Barton, Upper Montclair, N. J., assignor to General Electric Company, a corporation of New York Application August 24, 1932, Serial No. 630,253

10 Claims. (Cl. 175—363)

My invention relates to cooling systems for rectifier apparatus units or the like comprising a water-cooled rectifier or like vapor electric device supplied with current from a water-cooled transformer, particularly to such apparatus in which cooling water from city mains is circulated through the cooling system of the apparatus, and the principal object of the invention is to provide a method of and means for cooling the transformer and rectifier apparatus unit whereby the amount of water required therefor from the mains is reduced to a minimum.

In the operation of a power rectifying apparatus comprising a water-cooled rectifier supplied with electric current from a water-cooled transformer, separate water-cooling systems supplied from city mains have been provided heretofore for the rectifier and for the transformer, the water circulation systems supplied from the mains thus operating in parallel. In certain instances the above-mentioned usual parallel operated water-cooling system for the rectifier and transformer included in a given power rectifier apparatus unit has not been entirely satisfactory by reason of the relatively large amount of cooling water required. Particularly in the case of large power installations in localities, New York city for example, where the price of water per 1000 cu. ft. for industrial purposes is relatively high, the cost of cooling water for the rectifier apparatus becomes in such installations a very important item.

I have found that in many cases the cost of cooling water may be reduced, without impairing the efficiency and reliability of the rectifier installation as a whole and without operational and constructional complications, by an arrangement of the water-cooling apparatus whereby the losses in the rectifier and in the transformer are taken off by an amount of water flowing from the mains considerably less than that required in the parallel system of cooling heretofore employed.

In accordance with my invention the difficulty above described in the operation of high power rectifier apparatus in localities where the cost of cooling water is high is obviated, and a given quantity of cooling water from the mains is caused to absorb a relatively much greater heat loss than heretofore from the apparatus, by the provision of a method of and means for circulating the cooling water through the transformer portion and the rectifier portion of the apparatus unit in such a manner that the heat-loss absorbing means operate in series instead of in parallel.

I have found that a predetermined relatively small flow of a suitable cooling medium, preferably water, entering the apparatus unit at the water main temperature, may be caused, first, to take up the losses in the transformer, the water being thereby raised in temperature a predetermined amount, then caused to take up the losses in the rectifier and being thereby raised in temperature a second time, and finally discharged at this total temperature.

In carrying my invention into effect, I preferably arrange to circulate the incoming cooling water through the transformer cooling system and thereafter through one side of a water to water heat exchanger, through the other side of which water is circulated in a closed cooling system including the cooling jacket and cooling coils of the rectifier. Suitable temperature-controlled valves associated with the cooling system so control the water flow as to maintain the rectifier and transformer portions of the apparatus unit at the proper temperature under various load and operating conditions.

My invention will be better understood from the following description when considered in connection with the accompanying drawing and its scope will be pointed out in the appended claims.

Referring to the drawing, Fig. 1 is a semi-diagrammatic representation of a rectifier apparatus unit in which a series-arranged cooling system in accordance with my invention has been embodied; Figs. 2 and 3 illustrate semi-diagrammatically different types of the parallel cooling arrangement employed heretofore; and Fig. 4 shows curves illustrating the comparative quantities of cooling water required in the systems shown respectively in Figs. 1, 2 and 3.

In Fig. 1 the rectifier apparatus unit in which the cooling system in accordance with the present invention is embodied includes a rectifier 10 of the iron tank type and a supply transformer apparatus including a main transformer 11, and which may further include an interphase transformer (not shown), adapted to be connected to an alternating current network and to supply alternating current from the network to the rectifier. As the electrical connections in the system described form no part of my invention they are not illustrated in the drawing or further described herein.

In the water cooling system for the apparatus including rectifier 10 and transformer 11, pipe 12 is the inlet pipe for the cooling water from the city main and pipe 13 is the cooling water outlet pipe of the transformer. Pipe 13 connects the cooling system of the transformer to one side, as coil 14, of a water to water heat exchanger 15, the coil 14 of the heat exchanger being connected to a discharge pipe 16 from which connection may be made to a sewer outlet.

The cooling means for the rectifier portion of the apparatus unit, as distinguished from the above-described cooling means for the transformer portion, comprises a closed circulating system including the water jacket and cooling coils of the rectifier 10, a pipe 17 to connect the rectifier to the other side of the water to water heat exchanger 15 or that portion 18 of the space within the heat exchanger not occupied by the coil 14, a pipe 19 to connect the heat exchanger to a circulating pump 20, a pipe 21 to connect the circulating pump to a water storage tank 22, and a pipe 23 to connect the storage tank to the rectifier.

For the purpose of controlling the temperatures in the transformer portion and rectifier portion of the apparatus respectively, temperature controlled valves 24, 25 which may be of the well known sylphon type are preferably provided. Valve 24 is connected in a pipe 26 bypassing the coil 14 of heat exchanger 15 and connecting the water outlet of transformer 11 directly to the main discharge or outlet pipe 16, and the temperature bulb 27 of the valve 24 is located in the upper portion of the transformer, the bulb 27 being connected to the valve by a pipe 28. Valve 25 is connected in the pipe 13 connecting the water outlet of the transformer to one side, coil 14, of the heat exchanger 15, and the temperature bulb 29 of the valve 25 is located in the pipe 23 of the closed circulating system comprising the rectifier jacket and coils, side 18 of heat exchanger 15, pump 20 and storage tank 22, the bulb 29 being connected to the valve 25 by a pipe 30.

In the operation of the series-arranged cooling system embodied in the rectifying apparatus unit comprising a rectifier 10 and a supply transformer apparatus 11 as illustrated in Fig. 1, in order to absorb the heat losses of the unit, water at the relatively low temperature of the water mains flows from the mains into inlet pipe 12 of transformer 11 and through the cooling coils of the transformer, whereby the temperature of the water flowing from the transformer to the heat exchanger 15 through pipe 13 is increased by a predetermined relatively small amount, the water thence flowing through one side, coil 14, of the water to water heat exchanger 15 and through the discharge pipe 16 to the sewer. At the same time the water in the closed cooling system comprising the cooling jackets and coils of rectifier 10 and the other side 18 of heat exchanger 15 is circulated by pump 20 to cause the rectifier heat losses, transferred from the rectifier to the cooling water in this closed system, to be taken up in the water to water heat exchanger 15 by the water flowing from the transformer 11 through the coil 14 and already raised in temperature a predetermined small amount by the heat losses in the transformer. The water finally discharged through pipe 16 from the side or coil 14 of the heat exchanger 15 is, therefore, further increased in temperature by a relatively large predetermined amount by reason of the heat losses transferred thereto from the rectifier 10.

It will be readily understood that the heat losses of the transformer 11 raise the temperature of the water passing therethrough and that the passage of this water through the heat exchanger 15 to absorb therein the additional heat losses due to the operation of the rectifier 10 results in a higher total temperature than heretofore obtained of the water discharged from the cooling system to the sewer, with a consequent saving in gallons of water per minute required.

Under full load or overload conditions wherein both the rectifier 10 and transformer 11 are subjected substantially to their maximum heat losses, the valve 25, operating in a well known manner in accordance with the temperature in bulb 29, remains open to permit a relatively large flow of cooling water through the side or coil 14 of heat exchanger 15, and the valve 24 simultaneously remains closed, thereby preventing the bypassing of cooling water around the heat exchanger 15 through the pipe 26. Under these conditions the maximum heat-loss absorbing effect of the series-operating cooling system is attained.

At partial loads the heat losses to which the apparatus unit is subjected are reduced. Under such conditions of partial load, greater than predetermined light or minimum loads, the valve 25 operates, in accordance with the temperature of the bulb 29 immersed in the circulating water of the closed cooling system, to restrict the flow of water in the main or open cooling system as required for the absorption of the smaller heat losses to which the apparatus unit is subjected. The valve 24 remains closed under the above partial load condition.

At light loads the transformer 11 is subjected substantially only to excitation losses and the rectifier 10 to very small losses. Under these conditions, the valve 25 operates, as above described under partial load conditions, to restrict further the flow of water in the main or open cooling system. Should, however, light load or no load conditions continue for a considerable time the excitation losses in the transformer 11 may tend to cause an undue rise of temperature therein. Under these latter conditions the valve 24 operates, in accordance with the temperature in bulb 27 located in the top of transformer 11, to open the bypass 26 around the heat exchanger 15 thereby permitting a flow of water through the cooling system of the transformer, directly to the discharge 16, sufficient to protect the transformer from overheating due to the excitation losses.

It will be observed that the heat loss absorbing means above described in connection with Fig. 1, comprising, first, the water flowing in the main or open cooling system from the inlet 12 through the transformer 11 and thence through the heat exchanger 15 to the discharge 16, and second, the water circulating in the secondary or closed cooling system through the rectifier 10 and the heat exchanger 15, operate in series to absorb initially the heat losses of the transformer portion 11 of the apparatus and, in seriatim, to absorb the heat losses of the rectifier portion 10.

It will be readily seen, further, from the following comparison of the apparatus illustrated in Fig. 1, and embodying the series-operating cooling system in accordance with my invention, with the apparatus illustrated in Figs. 2 and 3 embodying parallel-operating types of cooling systems as heretofore employed that the advantages of the series-operating cooling system are secured without complication in design and without sacrificing reliability of operation.

In Fig. 2, the heat-loss absorbing means for the rectifier apparatus unit comprises two independent cooling systems for the transformer 11 and the rectifier 10, respectively, supplied from water mains connected to inlet 12 and discharging through outlet pipe 16 to the sewer. The cooling system for the transformer portion of the apparatus of Fig. 2 includes a pipe 31 connecting the inlet 12 to the transformer 11, and a pipe 32 connecting the outlet of the transformer to the discharge pipe 16. The amount of cooling water flowing through the transformer 11 is controlled for varying load conditions in the transformer by a valve 33 located in the pipe 32 and operating in accordance with the temperature in the upper portion of the transformer. The cooling system for the rectifier portion of the apparatus of Fig. 2 includes a pipe 34 connecting inlet 12 to one side of a water to water heat exchanger 35, a pipe 36 connecting this side of the exchanger to the outlet 16, the cooling jackets and cooling coils of the rectifier 10, a pipe 37 connecting the rectifier to the other side of the heat exchanger 35, a pipe 38 connecting this other side of the heat exchanger to a pump 39, a pipe connecting the pump to a storage tank 41, and a pipe 42 connecting the storage tank to the rectifier. The amount of cooling water flowing through pipe 34 and heat exchanger 35 from inlet 12 to outlet 16 is controlled for varying load conditions in the rectifier 10 by a valve located in the pipe 34 and operating in accordance with the temperature of the water in the pipe 42 included in the closed circulating system.

The rectifying apparatus unit shown in Fig. 3 is similar in general to that shown in Fig. 2, two separate cooling systems being employed. For the transformer portion, the cooling system comprises, beginning at inlet pipe 12 and ending at outlet 16, pipe 31, transformer 11, and pipe 32. Instead, however, of the automatically operating and thermally controlled valve 33 shown in Fig. 2, the transformer cooling system of Fig. 3 includes a hand-operated valve 44 in the water cooling pipe line for the purpose of controlling the amount of cooling water flowing through the transformer 11 as required with changes of load in the transformer or to adjust for the rated load of the transformer. For the rectifier portion of the apparatus unit shown in Fig. 3 the operating elements and pipe and valve connections are the same as for the apparatus unit shown in Fig. 2.

In both Figs. 2 and 3, therefore, heat-loss absorbing systems arranged for parallel operation, as contrasted with the series-operated system shown in Fig. 1, employ essentially the same number of water circulating and controlling apparatus elements as are required in the heat-loss absorbing system of Fig. 1 and these elements are of substantially the same dimensions and cost as those of the system of Fig. 1. Further, obviously no more attention from operators is required in the system of Fig. 1 than in the systems of Figs. 2 and 3.

Referring to the curves shown in Fig. 4 illustrating the comparative quantities of cooling water required in the systems shown in Figs. 1, 2 and 3 respectively, curve 45 relates to the operation of the cooling system shown in Fig. 1, and curves 46 and 47 to the operation of the cooling systems shown in Figs. 2 and 3 respectively, the hand operated valve 44 in the system of Fig. 3 being adjusted for a constant flow of cooling water corresponding to the full load rating. In the rectifying apparatus units whose water cooling performance is illustrated by these curves the rating of the units is such that full rated load occurs in the region of the point at which curves 46 and 47 cross.

Actual results obtained by the series-arranged cooling system illustrated in Fig. 1 are further shown in the following table, wherein the quantity of water required for the system of Fig. 1 is compared with the quantity required, first, for the system of Fig. 2, the rectifier and transformer in Fig. 2 being separately cooled and the cooling in each automatically controlled for varying load as by the valves 33 and 43; second, for the system of Fig. 3, the rectifier and transformer in Fig. 3 being separately cooled, the cooling of the rectifier being automatically controlled for varying load, the cooling of the transformer, however, not being controlled for varying load but being adjusted for constant water flow corresponding to full load rating. In the table the cooling systems denominated A1, A2, A3 correspond respectively to the rectifying apparatus units of Figs. 1, 2 and 3, the assumed load per unit being that representing full operation conditions, the load conditions being those encountered in certain railway service. B1, B2, B3 correspond likewise respectively to the units of Figs. 1, 2, and 3 but in the case of B1, B2, B3 the assumed load per unit is that representing less than full operation conditions. The calculations in the table are based on the curves shown in Fig. 4.

| Cooling system | Hours operation | Kw. hours per day | Average gal. per min. | Gal. per day | Gal. per kw. hour |
|---|---|---|---|---|---|
| A1 | 24 | 45750 | 12.55 | 18100 | .3955 |
| A2 | 24 | 45750 | 20.1 | 29000 | .634 |
| A3 | 24 | 45750 | 31.1 | 44800 | .978 |
| B1 | 20.5 | 22300 | 7.54 | 10857 | .486 |
| B2 | 20.5 | 22300 | 11.16 | 16088 | .720 |
| B3 | 20.5 | 22300 | 26.80 | 38664 | 1.735 |

It will be seen that under the actual service conditions set forth in the above table, the cooling system in accordance with my invention in which the heat-absorbing means operate in series, as illustrated in Fig. 1, effects a marked saving in amount of cooling water required from the mains, as compared to the amount required in usual parallel operated cooling systems as illustrated in Figs. 2 and 3, and a consequent material lowering of the cooling water cost item. Under continued maximum load conditions instead of the more or less intermittent load conditions of the above table, the saving of cooling water due to the series cooling arrangement of Fig. 1 will be still more marked, as will be readily apparent from an inspection of the curves of Fig. 4.

In the drawing and in the foregoing description of my invention the heat losses of the rectifier 10 are set forth as taken up by the cooling water from the mains by means of the water to water heat exchanger 15 through one side of which 18, flows the water which is circulated in the closed cooling system comprising the cooling jacket of the rectifier. It will be readily apparent, however, that the heat exchanger 15 may be dispensed with and that the cooling water which first flows through the transformer 11 may then be caused to flow directly through the jacket of the rectifier 10, the heat exchanger being preferably incorporated in the system for the purpose of avoiding the necessity of providing, for rectifier 10, a water tight cooling jacket which, in the absence of the heat exchanger, would be desirable or necessary in place of the open top jacket commonly used in connection with iron tank rectifiers.

What I claim as new and desire to secure by Letters Patent of the United States, is:

1. The combination with a rectifying apparatus unit or the like comprising a vapor electric apparatus and a transformer apparatus to supply electric current to the vapor electric apparatus, of cooling means associated with said apparatus unit, a source of cooling medium, and means including said cooling means to cause cooling medium from said source to absorb initially substantially all of the heat losses from said transformer apparatus to raise the temperature of said medium to a value lower by a predetermined amount than the operating temperature of said vapor electric apparatus, thereafter to absorb substantially all of the heat losses from said vapor electric apparatus to raise further the temperature of said medium, and finally to discharge said medium from said rectifying apparatus unit at the total temperature due to the absorption of said heat losses from the transformer apparatus and said heat losses from the vapor electric apparatus.

2. The combination with a rectifying apparatus unit or the like comprising a vapor electric apparatus and a transformer apparatus to supply electric current to the vapor electric apparatus, of cooling means associated with said apparatus unit, a source of cooling medium, and means including said cooling means to cause cooling medium from said source to absorb initially substantially all of the heat losses from said transformer apparatus to raise the temperature of said medium by an initial relatively small amount and to a value lower by a predetermined amount than the operating temperature of said vapor electric apparatus, thereafter to cause said cooling medium to absorb substantially all of the heat losses from said vapor electric apparatus to raise further the temperature of said medium by a greater amount than said initial amount, and finally to discharge said cooling medium from said rectifying apparatus unit at the total temperature due to the absorption of said heat losses from the transformer apparatus and said heat losses from the vapor electric apparatus.

3. The combination with a rectifying apparatus unit or the like comprising a vapor electric apparatus and a transformer apparatus to supply electric current thereto, of a heat exchanger, a closed circulating system including said vapor electric apparatus and one side of said heat exchanger, means to circulate a heat loss transferring medium in said closed system to transfer substantially all of the heat losses in said vapor electric apparatus to said heat exchanger, a source of cooling medium, cooling means associated with said transformer apparatus, and means to cause cooling medium from said source to flow in series through said transformer cooling means and the other side of said heat exchanger, said medium being discharged from said heat exchanger at a temperature determined by the heat losses transferred to said medium from the transformer and the vapor electric apparatus.

4. The combination with a rectifying apparatus unit or the like comprising a vapor electric apparatus and a transformer apparatus to supply electric current thereto, of a heat exchanger, a closed circulating system including said vapor electric apparatus and said heat exchanger, means to circulate a heat loss transferring medium in said closed system to transfer substantially all of the heat losses in said vapor electric apparatus to said heat exchanger, a source of cooling medium, means to cause cooling medium from said source to absorb heat losses from said transformer apparatus to raise the temperature of said cooling medium and means to cause thereafter said cooling medium to absorb heat losses transferred to said heat exchanger from said vapor electric apparatus to raise further the temperature of said cooling medium to a predetermined total temperature, said medium being discharged from said heat exchanger at said total temperature.

5. The combination with a rectifying apparatus unit or the like comprising a vapor electric apparatus and a transformer apparatus to supply electric current thereto, of cooling means associated with said apparatus unit, a source of cooling medium, means including said cooling means to cause cooling medium from said source to absorb in series heat losses from said transformer apparatus and said vapor electric apparatus, valve means responsive to the temperature of said vapor electric apparatus to control the amount of heat losses absorbed by said medium from said vapor electric apparatus, and valve means responsive to the temperature of said transformer apparatus to cause increased absorption of heat losses from said transformer apparatus by cooling medium from said source.

6. The combination with a rectifying apparatus unit or the like comprising a vapor electric apparatus and a transformer apparatus to supply electric current thereto, of a heat exchanger, a closed circulating system including said vapor electric apparatus and said heat exchanger, means to circulate a heat loss transferring medium in said closed system, a source of cooling medium, means to cause said cooling medium to absorb in series heat losses from said transformer apparatus and from said heat loss transferring medium in said heat exchanger, valve means responsive to the temperature of said heat loss transferring medium to control the amount of heat losses absorbed therefrom by said cooling medium, and valve means responsive to the temperature of said transformer apparatus to cause increased absorption of heat losses from said transformer apparatus by cooling medium from said source.

7. In a system for absorbing in a cooling medium the heat losses of a rectifying apparatus unit or the like comprising a vapor electric apparatus and a transformer apparatus for supplying electric current to the vapor electric apparatus, the method of operation which includes initially absorbing substantially all of the heat losses of said transformer apparatus in said medium to raise the temperature of said medium to a value lower by a predetermined amount than the operating temperature of said vapor electric apparatus, thereafter absorbing substantially all of the heat losses of said vapor electric apparatus in said medium to increase further the temperature of said medium, and finally discharging said medium from said rectifying apparatus unit at the total temperature due to the absorption of said heat losses from the transformer apparatus and said heat losses from the vapor electric apparatus.

8. In a system for absorbing in a cooling medium the heat losses of a rectifying apparatus unit or the like comprising a vapor electric apparatus, a transformer for supplying electric current to said vapor electric apparatus, and a closed circulating system including said vapor electric apparatus to transfer substantially all of the heat losses in said vapor electric apparatus to said medium, the method of operation which includes initially absorbing in said medium said heat losses of said transformer apparatus to raise the temperature of the medium, thereafter absorbing in said medium said heat losses transferred to the medium by said closed circulating system from said vapor electric apparatus to raise said medium to a total predetermined temperature, and discharging said medium from said rectifying apparatus unit at said total temperature.

9. In a system for absorbing in a cooling medium the heat losses of a rectifying apparatus unit or the like comprising a vapor electric apparatus, a transformer apparatus for supplying electric current to said vapor electric apparatus, a heat exchanger, and a closed circulating system including said vapor electric apparatus and said heat exchanger to transfer substantially all of the heat losses in said vapor electric apparatus to said medium, the method of operation which includes initially absorbing in said medium heat losses of said transformer apparatus to raise the temperature of the medium, thereafter absorbing in said medium said heat losses transferred to the medium by said closed circulating system from said vapor electric apparatus through said heat exchanger to raise said medium to a total predetermined temperature, and discharging said medium from said heat exchanger at said total temperature.

10. The combination with a rectifying apparatus unit comprising a vapor electric apparatus and a transformer apparatus to supply electric current to said vapor electric apparatus, of cooling means associated with said apparatus unit, a source of cooling medium, means including said cooling means to cause cooling medium from said source to absorb in series heat losses from said transformer apparatus and said vapor electric apparatus, and means responsive to the temperature of said vapor electric apparatus to control the amount of heat loss absorbed by said medium from said transformer apparatus and said vapor electric apparatus.

THEOPHILUS F. BARTON.